United States Patent
Muniz (10) Patent No.: US 9,927,047 B2
(45) Date of Patent: Mar. 27, 2018

(54) CLAMP FOR PIPE (71) Applicant: General Electric Company, Schenectady, NY (US)

(72) Inventor: Jose Luis Muniz, Houston, TX (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/219,601

(22) Filed: Jul. 26, 2016

(65) Prior Publication Data

US 2018/0031147 A1    Feb. 1, 2018

(51) Int. Cl.
*F16L 3/00* (2006.01)
*F16L 3/10* (2006.01)

(52) U.S. Cl.
CPC ............... *F16L 3/1033* (2013.01); *F16L 3/00* (2013.01)

(58) Field of Classification Search
CPC . F16L 3/1033; F16L 3/00; F16L 19/06; F16L 21/06
USPC ................ 248/65, 67, 74.1, 74.4, 49, 300
See application file for complete search history.

(56) References Cited

U.S. PATENT DOCUMENTS

| | | | |
|---|---|---|---|
| 2,372,674 A * | 4/1945 | Clyde | F16L 3/1226 248/65 |
| 2,888,072 A * | 5/1959 | Nicholas | G03B 21/58 160/351 |
| 2,936,803 A | 5/1960 | Jorick, Jr. | |
| 3,776,539 A | 12/1973 | Curtis et al. | |
| 4,255,378 A | 3/1981 | Miller et al. | |
| 5,290,166 A | 3/1994 | Heatherly | |
| 6,123,366 A * | 9/2000 | Kiriakopolos | F16L 43/00 248/74.1 |
| 6,912,886 B1 | 7/2005 | Maes | |
| 8,087,425 B2 * | 1/2012 | Railsback | F16L 3/1233 137/355.16 |
| 8,230,883 B2 * | 7/2012 | Takeshita | F16L 3/1091 137/797 |
| 8,528,291 B2 * | 9/2013 | Allred, III | E04C 3/08 135/909 |
| 8,718,222 B2 | 5/2014 | Abura et al. | |

(Continued)

FOREIGN PATENT DOCUMENTS

EP    2 154 413    5/2012

OTHER PUBLICATIONS

The Fabricator, "Tube and pipe basics: How to achieve the perfect bend," Feb. 2014, accessed Dec. 27, 2016, from http://www.thefabricator.com/article/tubepipefabrication/tube-and-pipe-basics-how-to-achieve-the-perfect-bend (6 pages).

(Continued)

*Primary Examiner* — Muhammad Ijaz
(74) *Attorney, Agent, or Firm* — Nixon & Vanderhye P.C.

(57) ABSTRACT

A clamp including a first bracket having a first base plate with a first mating surface and a first curved edge, a first channel and a second channel; a second bracket having a second base plate with a second mating surface and a second curved edge, a third channel and a fourth channel; wherein the first base plate is clamped to the second base plate such that the first and third channels engage the first pipe section and such that the second and fourth channels engage the second pipe section; and wherein the first curved edge aligns with the second curved edge to form a joint line that is configured to extend in continuous abutment with a continuously curved pipe edge.

18 Claims, 9 Drawing Sheets

(56) References Cited

U.S. PATENT DOCUMENTS

| | | | |
|---|---|---|---|
| 9,145,907 B2* | 9/2015 | Liang | F16B 7/0486 |
| 2003/0221251 A1* | 12/2003 | Tse | E03C 1/06 |
| | | | 4/570 |
| 2010/0192506 A1* | 8/2010 | Allred | E04C 3/08 |
| | | | 52/655.1 |
| 2011/0025041 A1* | 2/2011 | Birch | F16L 1/0246 |
| | | | 285/24 |

OTHER PUBLICATIONS

Product description for Holdrite 705—⅜" to ½" Plastic PEX Bend Support for wood mount, SupplyHouse.com, 2016, accessed Dec. 27, 2016, from http://www.supplyhouse.com/Holdrite-705-3-8-to-1-2-Plastic-PEX-Bend-Support-for-wood-mount (4 pages).

Product description for NIBCO ½" PEX Metal Bend Support With Nailplate NP40N, accessed Dec. 27, 2016, from https://www.supply.com (1 page).

* cited by examiner

CLAMP FOR PIPE

BACKGROUND OF THE INVENTION

The present invention relates to the field of pipe couplings, and specifically to techniques for preventing pipe failure during application of torque to a pipe coupling.

Pipe couplings commonly include the use of a pipe and a pipe coupler. A pipe and an additional pipe or additional structure are connected together and tightened with a nut to prevent leakage and to provide a firm seal. Often, one pipe includes a bent portion located proximate the nut.

To facilitate coupling between the pipe and the additional pipe or additional structure, the nut is rotated by a tool such as a torque wrench. The nut is tightened by the tool. Torque is applied on the nut by rotation of the tool. Torque is then transferred into the pipe including the area of the bent portion of the pipe. The torque transferred into the bent portion of the pipe frequently leads to crimping, bending, or a deformation of the bent portion of the pipe.

There is a long felt need to reduce the likelihood of crimping, bending, or a deformation of a pipe during application of torque.

BRIEF SUMMARY OF INVENTION

The inventors conceived of a two-piece bracket that prevents crimping, bending, or a deformation of the bent portion during application of torque caused by tightening of the nut. The inventors realized that use of a bracket with a bracket edge that follows and abuts the contour of the bent portion reduces or eliminates any risk of the bent portion deforming during the application of torque. The inventors realized that providing a two-piece bracket with a continuous contour provided at the bent portion reduces or eliminates the potential for crimping, bending, or a deformation of the bent portion during the application of torque.

The invention may be embodied as a clamp comprising: a first bracket comprising a first base plate with a first mating surface and a first curved edge, a first leg extending from an edge of the first base plate and a second leg extending from a second edge of the first base plate; wherein the first leg comprises a first channel and the second leg comprises a second channel; a second bracket comprising a second base plate with a second mating surface and a second curved edge, a third leg extending from an edge of the second base plate and a fourth leg extending from a second edge of the first base plate; wherein the third leg comprises a third channel and the fourth leg comprises a fourth channel; wherein the first base plate is clamped to the second base plate such that the first and third channels engage the first pipe section and such that the second and fourth channels engage the second pipe section; and wherein the first curved edge aligns with the second curved edge to form a joint line that is configured to extend in continuous abutment with a continuously curved pipe edge.

The invention may also be embodied as a clamp assembly for a pipe comprising: a first pipe section; a second pipe section; a bent pipe portion between the first pipe section and the second pipe section, the bent pipe portion comprising a continuously curved pipe edge; a first bracket comprising a first base plate with a first mating surface and a first curved edge, a first leg extending from an edge of the first base plate and a second leg extending from a second edge of the first base plate; wherein the first leg comprises a first channel and the second leg comprises a second channel; a second bracket comprising a second base plate with a second mating surface and a second curved edge, a third leg extending from an edge of the second base plate and a fourth leg extending from a second edge of the first base plate; wherein the third leg comprises a third channel and the fourth leg comprises a fourth channel; wherein the first base plate is clamped to the second base plate such that the first and third channels engage the first pipe section and such that the second and fourth channels engage the second pipe section; and wherein the first curved edge aligns with the second curved edge to form a joint line that is configured to extend in continuous abutment with the continuously curved pipe edge.

The invention may also be embodied as a method of assembling a clamp for a pipe comprising: engaging a first bracket with a first pipe section such that a first channel engages the first pipe section and a second channel engages a second pipe section; engaging a second bracket with a first pipe section such that a third channel engages the first pipe section and a fourth channel engages the second pipe section; mating a first base plate of the first bracket with a second base plate of the second bracket; aligning a first curved edge of the first bracket with a second curved edge of the second bracket to form a joint line; aligning a first aperture of the first bracket with a second aperture of the second bracket; clamping the first bracket to the second bracket by passing a fastener through the first aperture and the second aperture; and wherein the joint line is configured to extend in continuous abutment with a continuously curved pipe edge of a bent pipe portion.

DETAILED DESCRIPTION OF THE INVENTION

Figure 1:
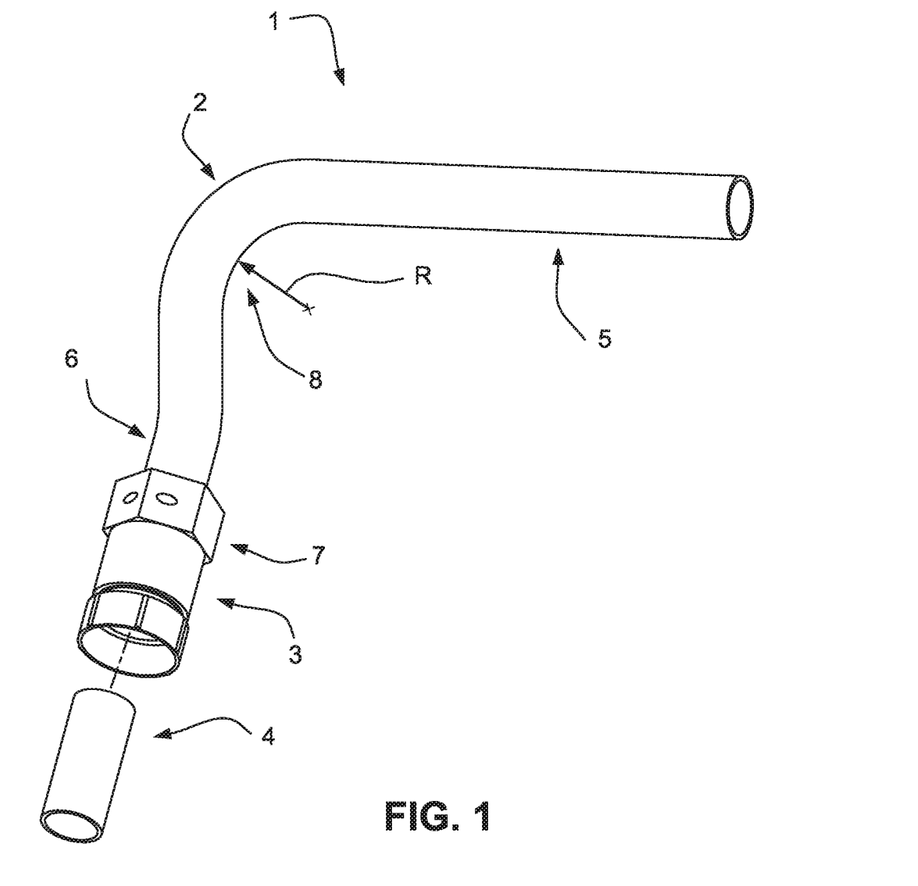
FIG. 1 is side view of a pipe coupling.

FIG. 1 shows a side view of a pipe 1 with a bend 2 and an end with a coupling 3. Coupling 3 connects pipe 1 to another device 4, such as the end of another pipe. Coupling 3 includes a nut 7. Pipe 1 may be hollow and configured as a conduit for fluid, such as liquid or gas that passes through pipe 1 to other pipe 4.

Pipe 1 includes a first straight pipe section 5 on one end of bend 2 and a second straight pipe section 6 on an opposite side of bend 2. Bend 2 has a curvature with a radius R and a radially inward surface 8 on an outer surface of pipe 1.

Figure 2:
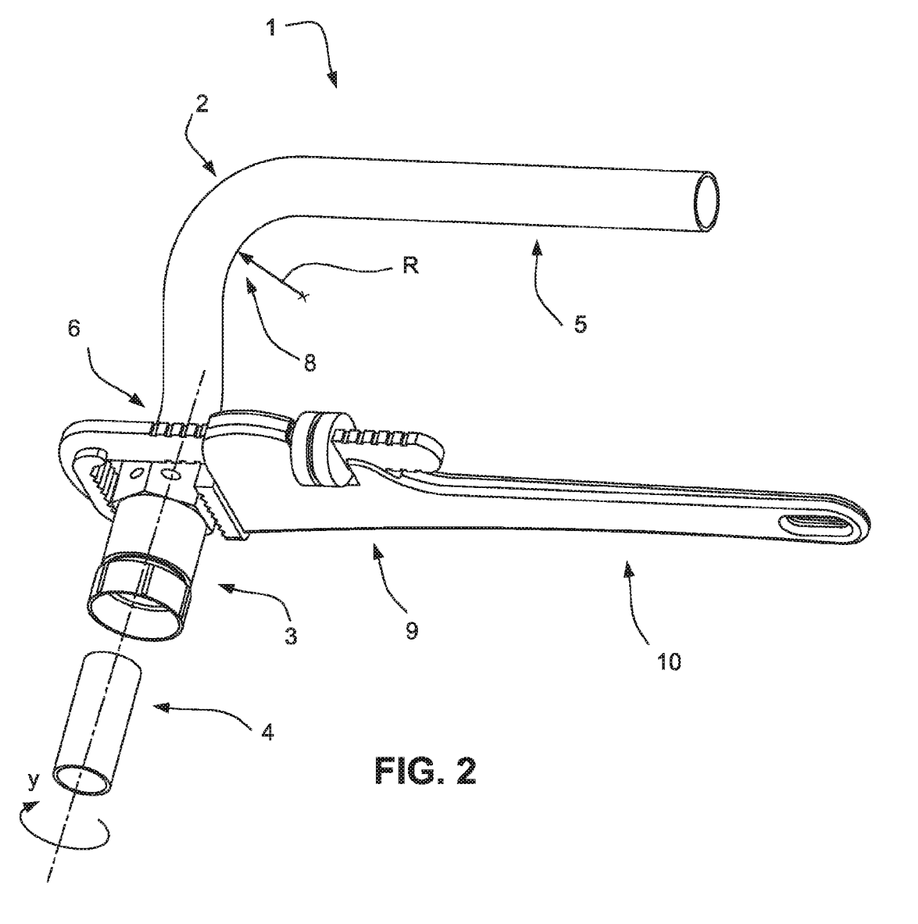
FIG. 2 is side view of a pipe coupling with a tool shown.

FIG. 2 shows a side view of pipe 1. A tool 9 engages nut 7. Tool 9 may be a torque wrench, but may also be any tool capable of engaging nut 4 to rotate nut 7 around axis Y. Tool 9 includes a handle 10.

Figure 3:
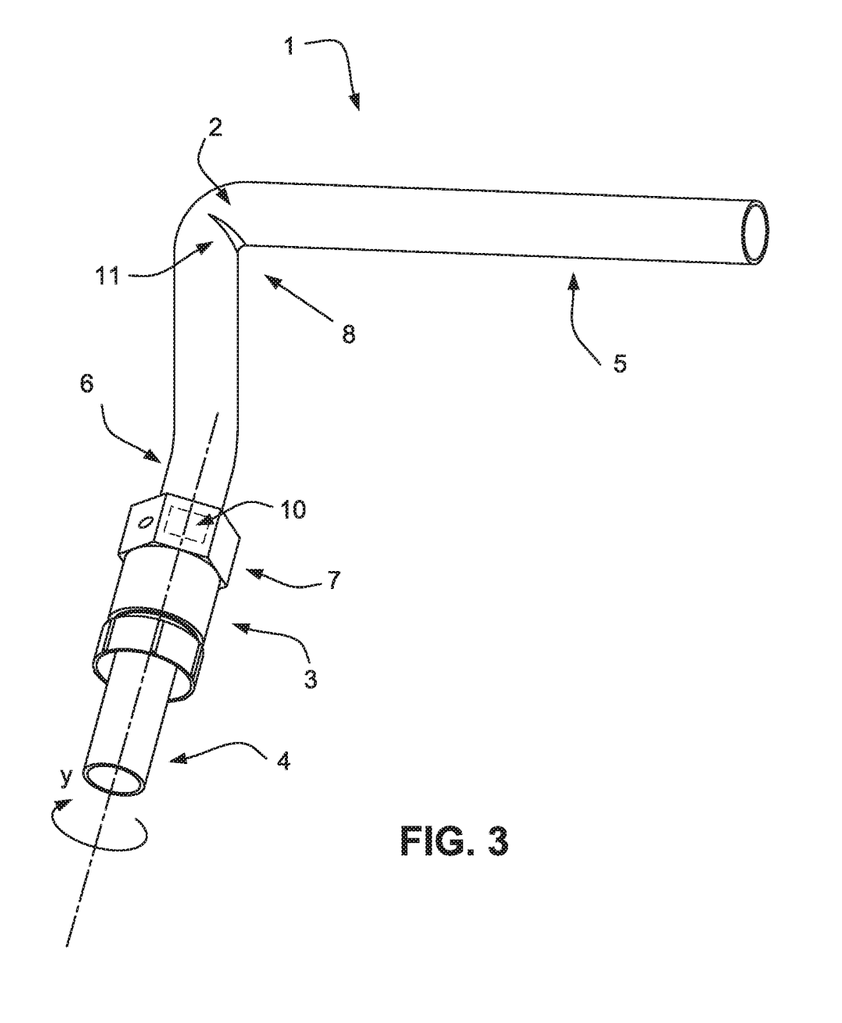
FIG. 3 is side view, of a pipe coupling crimped at a pipe bend.

FIG. 3 shows a side view of a pipe 1 with handle 10 and tool 9 rotated. A user rotates handle 10 which rotates tool 9. Rotation of tool 9 applies a torque force on nut 7 which rotates nut 7. Rotation of nut 7 fastens and seals second pipe section 6 to additional pipe 4 to prevent leakage. The torque force is transferred from tool 9 into nut 7 and from nut 7 into bend 2. The transfer of torque may cause bend 2 to crimp at 11, bend, fracture, or otherwise deform which may cause failure of pipe 1. Crimping at 11 impedes, constrains, or eliminates the passage of fluid through pipe 1 and into additional pipe 4.

Figure 4:
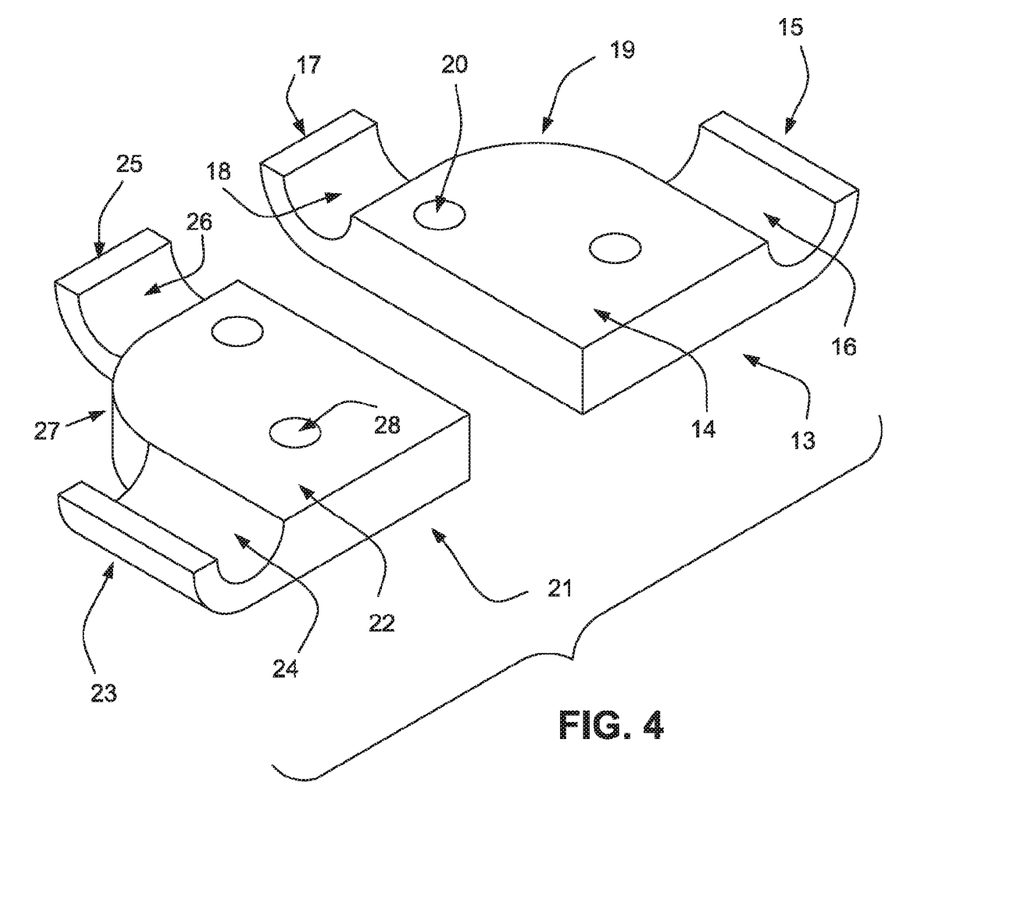
FIG. 4 is a side view of an embodiment of a pipe clamp shown in cross section.

FIG. 4 shows a side view of bracket assembly 12. Bracket assembly 12 includes a first bracket 13. First bracket 13 includes a first base plate 14 with a first leg 15 and a second leg 17. First leg 15 extends substantially perpendicular to second leg 17, and a space between first leg 15 and second leg 17 is open. First leg 15 includes a first channel 16 and second leg 17 includes a second channel 18. First base plate 14 includes a curved edge 19 and at least one aperture 20.

Bracket assembly 12 further includes a second bracket 21. Second bracket 21 includes a second base plate 22 with a third leg 23 and a fourth leg 25. Third leg 23 extends substantially perpendicular to fourth leg 25, and a space between third leg 23 and fourth leg 25 is open. Third leg 23 includes a third channel 24 and fourth leg 25 includes a fourth channel 26. Second base plate 22 includes a curved edge 27 and at least one aperture 28.

Second bracket 21 is a mirror image of first bracket 13. This arrangement provides advantages including less scrap and material waste, less reworking of the brackets, greater workmanship repeatability, and simple installation and removal of the brackets.

Figure 5:
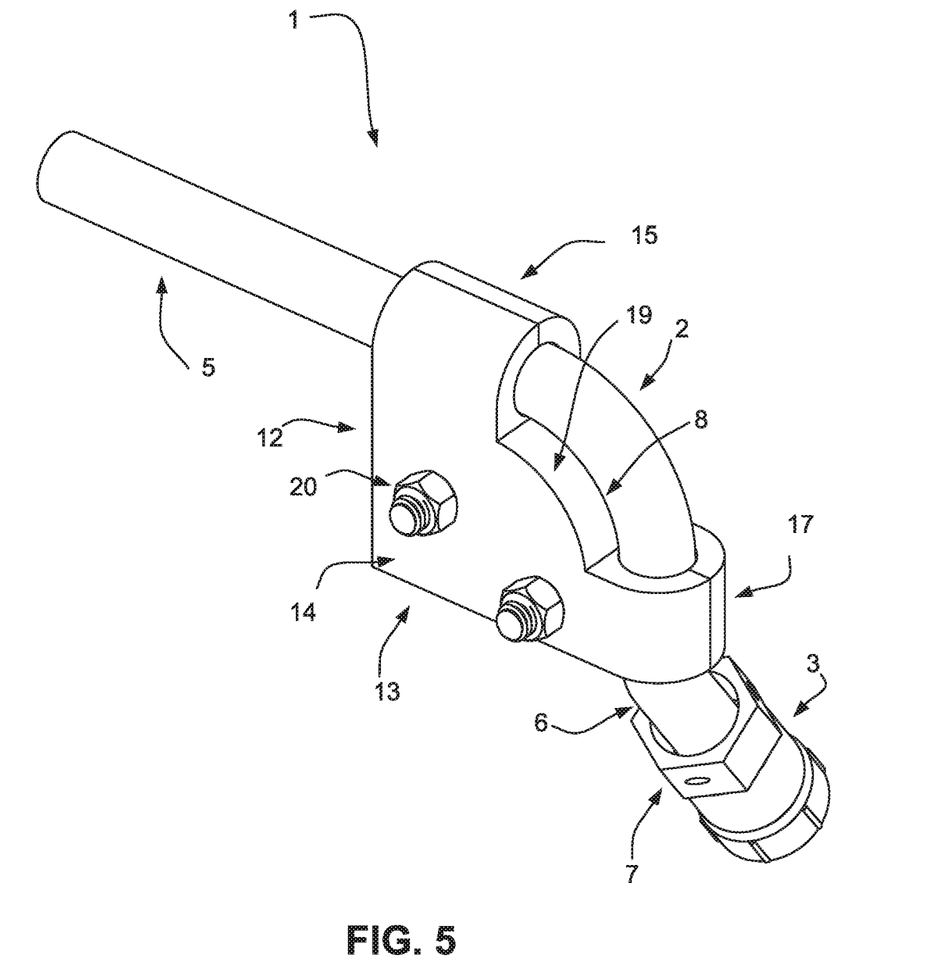
FIG. 5 is a side view of an embodiment of a pipe clamp.

FIG. 5 shows a side view of pipe 1 with bracket assembly 12 assembled thereon. First channel 16 engages a side of first pipe section 5. Second channel 18 engages a side of second pipe section 6. Second bracket 21 (not shown) engages an opposite side of pipe 1. Fasteners pass through apertures 20 and 28 to clamp first bracket 13 to second bracket 21. The fasteners may include nuts, bolts, nails, vice grips, or any structure capable of clamping first bracket 13 to second bracket 21.

Figure 6:
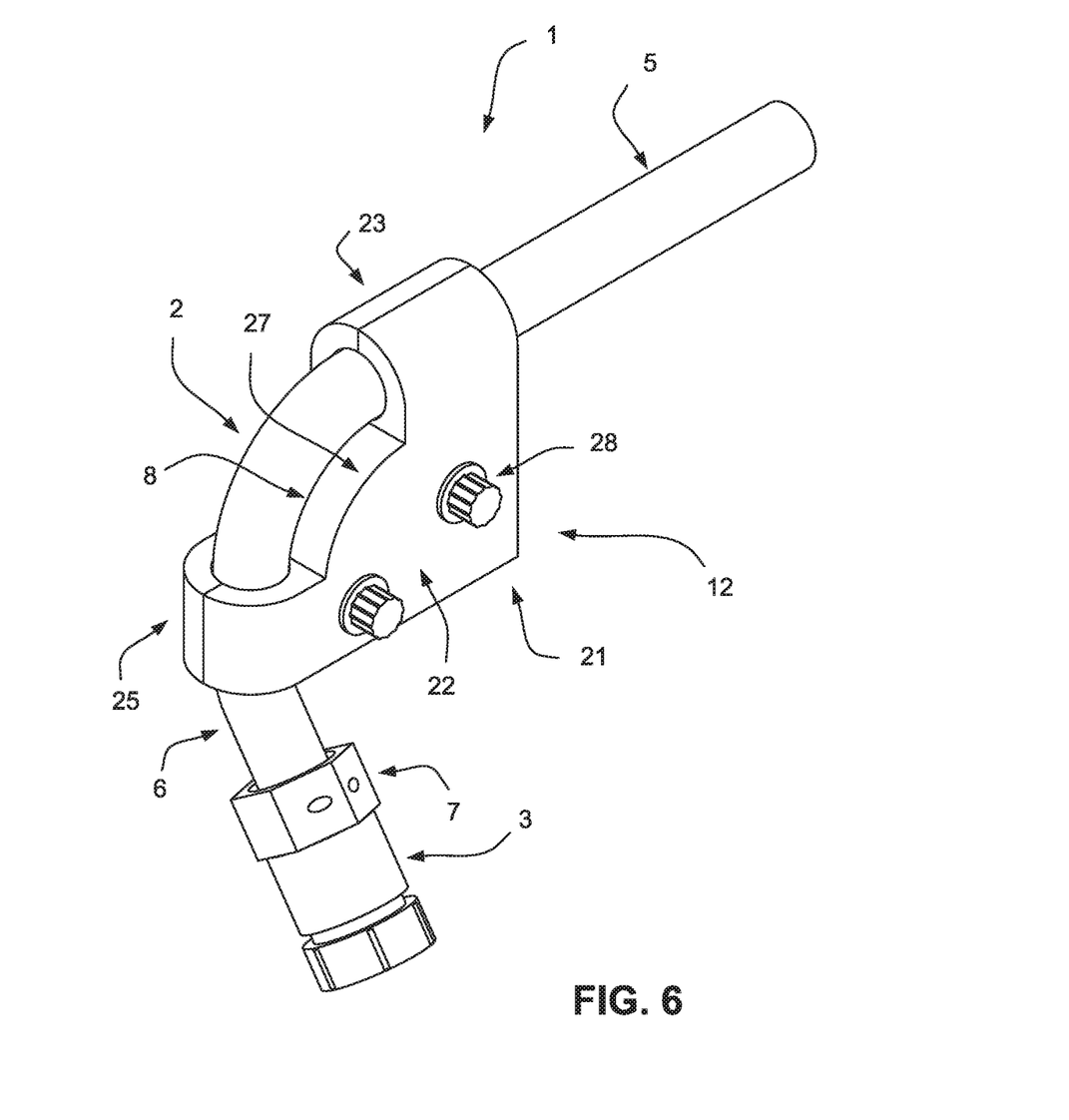
FIG. 6 is a side view of an embodiment of a pipe clamp.

FIG. 6 shows a side view of pipe 1 with bracket assembly 12 assembled thereon. Third channel 24 engages a side of first pipe section 5. Fourth channel 26 engages a side of second pipe section 6. First bracket 13 (not shown) engages an opposite side of pipe 1. Fasteners pass through apertures 28 and 20 to clamp second bracket 21 to first bracket 13. Second bracket 21 is disposed on an opposite side of pipe 1 than first bracket 13.

Figure 8:
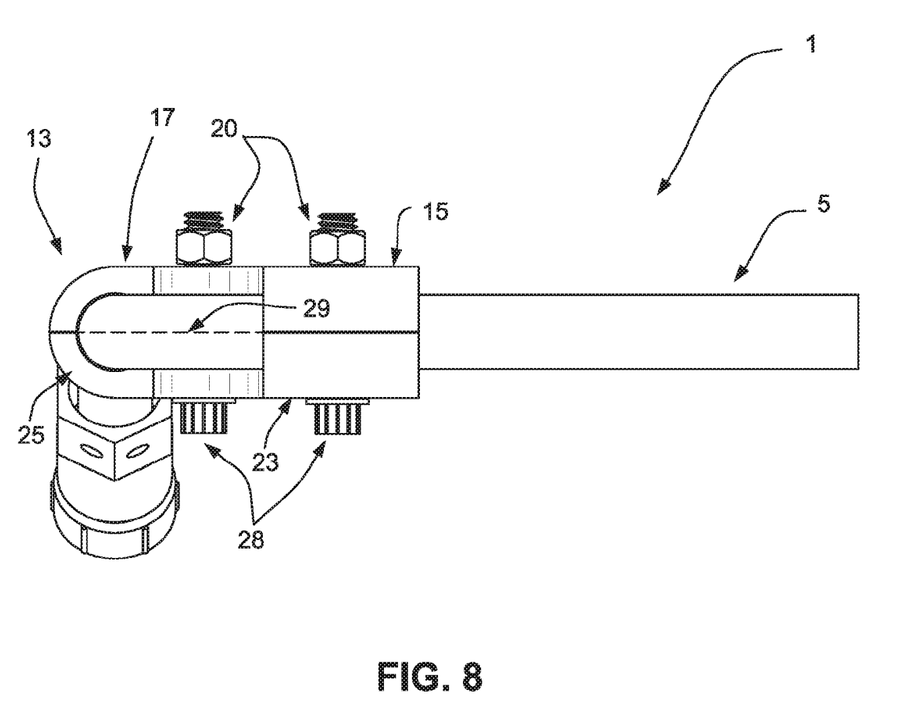
FIG. 8 top view of an embodiment of a pipe clamp.

Shown in FIG. 5-6, curved edge 19 of first bracket 13 aligns and abuts with curved edge 27 of second bracket to form joint line 29 (FIG. 8). Joint line 29, curved edge 19 and curved edge 27 extend in continuous alignment and abutment with radially inward surface 8 of bend 2.

Without continuous abutment of joint line 29 with radially inward surface 8, a space or opening would exist between bracket assembly 12 and bend 2 leaving bend 2 vulnerable to crimping, bending, fracturing, or deforming during the application of torque.

Specifically designing and manufacturing curved edge 19 and curved edge 27 to align with and abut radially inward surface 8 allows the torque force from rotation of nut 7 to be transferred into bracket assembly 12 instead of into bend 2. Transferring the torque force into bracket assembly 12 prevents bend 2 from crimping, bending, fracturing, or otherwise deforming. The transfer of torque force into bracket assembly 12 further allows pipe 1 to remain in proper shape and prevents bending during the application of torque.

Figure 7:
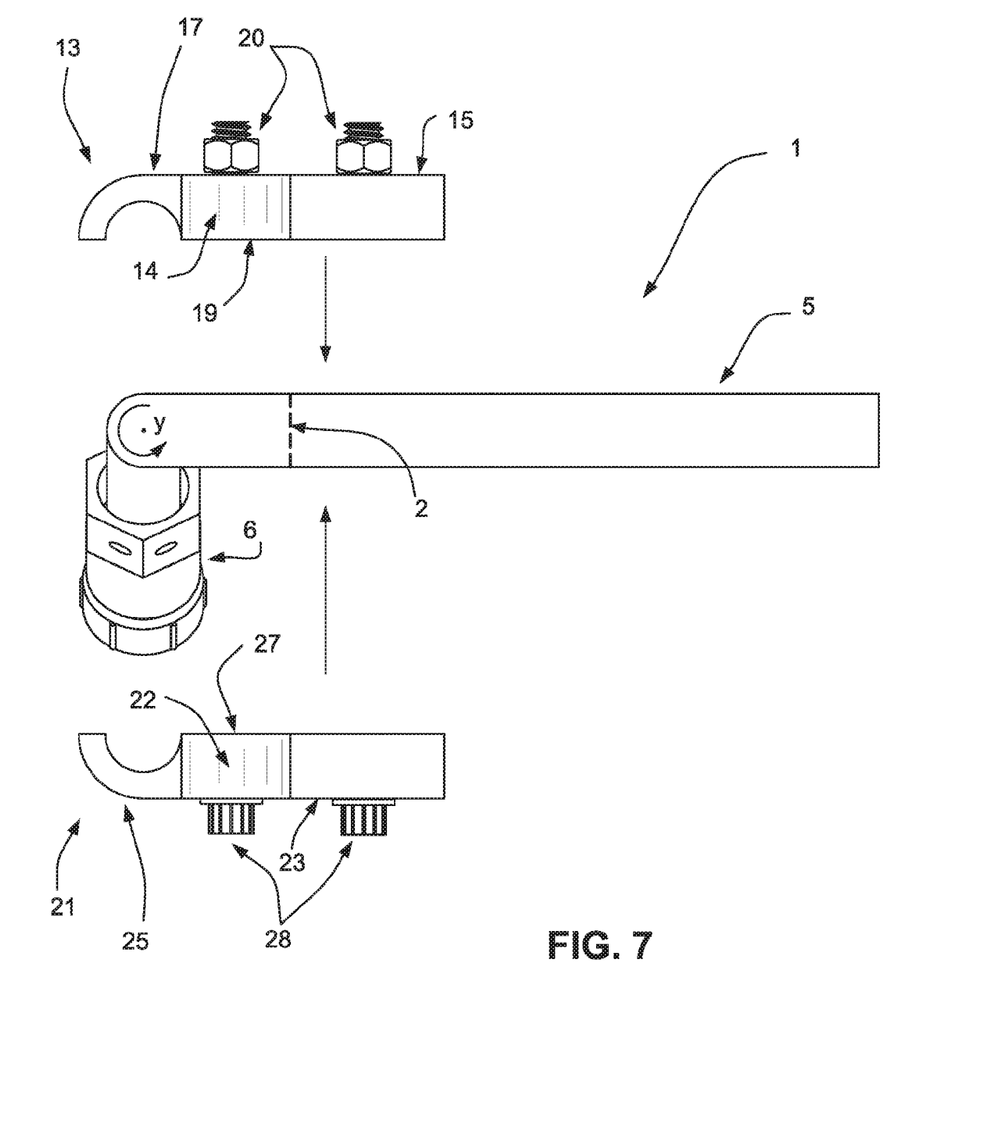
FIG. 7 is an exploded view of an embodiment of a pipe clamp.

FIG. 7 shows an exploded top view of pipe 1. First bracket 13 is disposed one side of pipe 1 and second bracket 21 is disposed on an opposite side of pipe 1.

FIG. 8 shows a top view of pipe 1 with bracket assembly 12 assembled thereon. First bracket 13 is disposed one side of pipe 1 and second bracket 21 is disposed on an opposite side of pipe 1. Fasteners pass through aligned apertures 20 and 28 to clamp first bracket 13 to second bracket 21. Joint line 29 extends in continuous abutment with radially inward surface 8.

Figure 9:
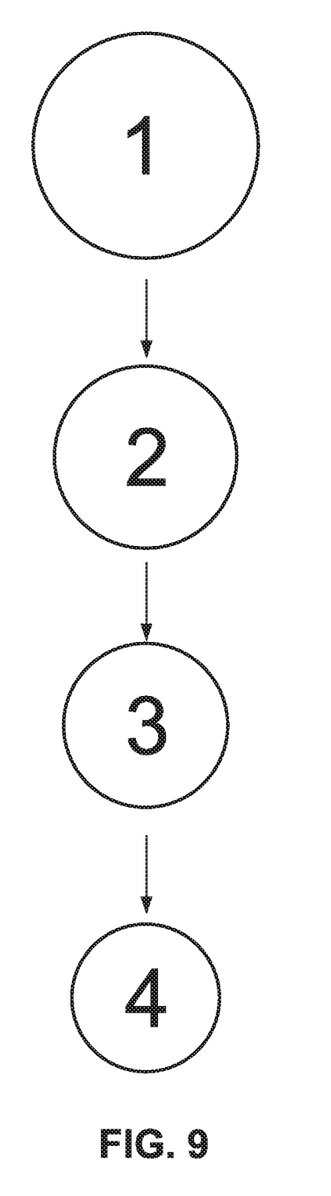
FIG. 9 is an assembly flow chart of an embodiment of the pipe clamp.

FIG. 9 shows an assembly flow chart of bracket assembly 12. In step 1, a pipe 1, bend 2, first bracket 13, second bracket 21 are manufactured. In step 2, first bracket 13 is positioned on a side of first pipe section 5 and on a side of second pipe section 6. First channel 16 engages first pipe section 5 and second channel 18 engages second pipe section 6. In step 3, second bracket 21 is positioned on an opposite side of first pipe section 5 and on an opposite side of second pipe section 6. Third channel 24 is engages first pipe section 5 and fourth channel 26 engages second pipe section 2. In this manner, first channel 16 and third channel 24 align and abut to engage first pipe section 5. Second channel 18 and fourth channel 26 align and abut to engage second pipe section 6. First base plate 14 mates with second base plate 22. Curved edge 19 aligns and abuts curved edge 27 to form joint line 29. Joint line 29 extends in continuous abutment with radially inward surface 8. In step 4, first bracket 13 and second bracket 21 are clamped together by fasteners passed through aligned apertures 20 and 28.

First bracket 13, second bracket 21, pipe 1 and additional pipe 4 may be made of metal such as steel or aluminum. First bracket 13, second bracket 21, pipe 1 and additional pipe 4 may also be made of any rigid or semi-rigid material including plastics such as polyvinyl chloride (PVC), polypropylene (PP) or polystyrene (PS). First bracket 13, second bracket 21 and additional pipe 4 may be made a material that is softer than that of pipe 1.

First bracket 13 and second bracket 21 may be formed by extrusion, molding, or 3D printing. To print each bracket using a 3D printer, a user may measure the diameter of pipe 1 and measure the curvature of bend 2. The user may determine the desired size of first bracket 13 and second bracket 21 such as by determining a desired length of first leg 15, second leg 17, third leg 23, and fourth leg 25. The user may determine a width of first bracket 13, second bracket 21, first channel 16, second channel 18, third channel 24, fourth channel 26, and apertures 20 and 28. A user may input the measurements into a computer-aided design program. The user may print first bracket 13 and second bracket 21 utilizing a 3D printer.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:
1. A clamp, the clamp comprising:
   a first bracket comprising a first base plate, a first leg and a second leg, wherein the first base plate includes a first mating surface and a first curved edge at a perimeter of the first base plate, the first leg extending outwards from the perimeter of the first base plate, and the second leg extending outwards from the perimeter of the first base plate;
   wherein the first curved edge extends continuously along the perimeter of the first base plate and is between the first leg and the second leg, and a first gap between the first leg and the second leg exposing the first curved edge of the the first base plate;

wherein the first leg comprises a first channel outward of the perimeter of the first base plate along a direction of a cross section of the first channel and an outer edge of the first leg is outwards of the first channel along the direction of the cross section of the first channel; and wherein the second leg comprises a second channel, wherein the second channel is outward of the perimeter of the first base plate along a direction of a cross section of the second channel and an outer edge of the second leg is outwards of the second channel along the direction of the cross section of the second channel;

a second bracket comprising a second base plate, a third leg and a fourth leg, wherein the second base plate includes a second mating surface and a second curved edge at a perimeter of the second bracket, the third leg extending outwards from the perimeter of the second base plate, and the fourth leg extending outwards from the perimeter of the first base plate;

wherein the second curved edge extends continuously along the perimeter of the second base plate and is between the third leg and the fourth leg, and a second gap between the third leg and the fourth leg exposing the second curved edge of the second base plate;

wherein the third leg comprises a third channel, wherein the third channel is outward of the perimeter of the second base plate along a direction of a cross section of the third channel and an outer edge of the third leg is outwards of the third channel along the direction of the cross section of the third channel; and wherein the fourth leg comprises a fourth channel, wherein the fourth channel is outward of the perimeter of the second base plate along a direction of a cross section of the fourth channel and an outer edge of the fourth leg is outwards of the fourth channel along the direction of the cross section of the fourth channel;

wherein the first base plate is configured to be removably clamped to the second base plate to clamp a continuous pipe having a first pipe section, a second pipe section, and a bent pipe section in between the first and second pipe sections, such that the first and third channels are configured to engage the first pipe section and such that the second and fourth channels are configured to engage the second pipe section; and wherein the first curved edge is configured to align with the second curved edge to form a joint line between the first and second base plates, the joint line is configured to extend along the first and second curved edges and configured to be in continuous abutment with the bent pipe section of the continuous pipe.

2. The clamp of claim 1 wherein the first bracket and the second bracket are symmetrical in shape and dimensions.

3. The clamp of claim 1 wherein the first leg extends substantially perpendicular to the second leg and wherein the third leg extends substantially perpendicular to the fourth leg.

4. The clamp of claim 1 wherein the first channel and the third channel are configured to be disposed on opposite sides of the first pipe section.

5. The clamp of claim 1 wherein the second channel and the fourth channel are configured to be disposed on opposite sides of the second pipe section.

6. The clamp of claim 1 wherein the first base plate comprises at least one first aperture, and wherein the second base plate comprises at least one second aperture.

7. The clamp of claim 6 wherein a fastener extends through the at least one first aperture and the at least one second to clamp the first bracket to the second bracket.

8. The clamp of claim 1 wherein the first bracket and the second bracket are made of metal.

9. A clamp assembly for a pipe, the clamp assembly comprising:

a continuous pipe comprising a first pipe section, a second pipe section, and a bent pipe portion connecting between the first pipe section and the second pipe section, the bent pipe portion being a continuously curved pipe; and a clamp comprising:

a first bracket comprising a first base plate with a first mating surface and a first curved edge on a perimeter of the first base plate, a first leg extending outwards from the perimeter of the first base plate and a second leg extending outwards from the perimeter of the first base plate;

a first gap between the first leg and the second leg exposing the first curved edge of the first base plate and extends continuously between the first leg and the second leg;

wherein the first leg comprises a first channel outward of the perimeter of the first base plate along a direction of a cross section of the first channel and an outer edge of the first leg is outwards of the first channel along the direction of the cross section of the first channel;

wherein the second leg comprises a second channel, wherein the second channel is outward of the perimeter of the first base plate along a direction of a cross section of the second channel and an outer edge of the second leg is outwards of the second channel along the direction of the cross section of the second channel; and a second bracket comprising a second base plate with a second mating surface and a second curved edge on a perimeter of the second base plate, a third leg extending outwards from the perimeter of the second base plate and a fourth leg extending outwards from the perimeter of the second base plate;

a second gap between the third leg and the fourth leg exposing the second curved edge of the second base plate; wherein the second curved edge extends continuously between the third leg and the fourth leg;

wherein the third leg comprises a third channel, wherein the third channel is outward of the perimeter of the second base plate along a direction of a cross section of the third channel and an outer edge of the third leg is outwards of the third channel along the direction of the cross section of the third channel;

wherein the fourth leg comprises a fourth channel, wherein the fourth channel is outward of the perimeter of the second base plate along a direction of a cross section of the fourth channel and an outer edge of the fourth leg is outwards of the fourth channel along the direction of the cross section of the fourth channel;

wherein the first base plate is removably clamped to the second base plate to engage the continuous pipe, such that the first and third channels engage the first pipe section and such that the second and fourth channels engage the second pipe section;

wherein the first curved edge aligns with the second curved edge to form a joint line between the first and second base plates; and wherein the joint line extends along the first and second curved edges and the joint line is in continuous abutment with the continuously curved pipe of the bent pipe portion.

10. The clamp assembly of claim 9 wherein the first bracket and the second bracket are symmetrical in shape and dimensions.

11. The clamp assembly of claim 9 wherein the first leg extends substantially perpendicular to the second leg and wherein the third leg extends substantially perpendicular to the fourth leg.

12. The clamp assembly of claim 9 wherein the first channel and the third channel are disposed on opposite sides of the first pipe section.

13. The clamp assembly of claim 9 wherein the second channel and the fourth channel are disposed on opposite sides of the second pipe section.

14. The clamp assembly of claim 9 wherein the first base plate comprises at least one first aperture, and wherein the second base plate comprises at least one second aperture.

15. The clamp assembly of claim 14 wherein a fastener extends through the at least one first aperture and the at least one second aperture to clamp the first bracket to the second bracket.

16. A method of assembling a clamp to a continuous pipe that includes a first pipe section, a second pipe section, and a bent pipe section located in between the first pipe section to the second pipe section, the method comprising:

engaging a first bracket with the first pipe section such that a first channel on a first leg of the first bracket engages the first pipe section, and a second channel on a second leg of the first bracket engages the second pipe section, wherein the first leg and the second leg extend outwards from a perimeter of a first base plate of the first bracket;

engaging a second bracket with the first pipe section such that a third channel on a third leg of the second bracket engages the first pipe section, and a fourth channel on a fourth leg of the second bracket engages the second pipe section, wherein the third leg and the fourth leg extend outwards from a perimeter of a second base plate of the second bracket;

mating the first base plate of the first bracket with the second base plate of the second bracket;

aligning a first curved edge of the first base plate with a second curved edge of the second base plate to form a continuous joint line between the first and second brackets, wherein the first curved edge extends along the perimeter between the first leg and the second leg, the second curved edge extends along the perimeter between the third leg and the fourth leg, and wherein a first gap is formed between the first leg and the second the second leg exposing the first curved edge of the first base plate, and a second gap is formed between the third leg and the fourth leg exposing the second curved edge of the second base plate;

aligning a first aperture of the first bracket with a second of the second bracket; and clamping the first bracket to the second bracket by passing a fastener through the first aperture and the second aperture, wherein the first bracket and the second bracket are removably clamped;

wherein the joint line is in continuous abutment with the bent pipe section of the continuous pipe.

17. The method of claim 16 wherein the first bracket is a mirror image of the second bracket.

18. The method of claim 16 further comprising entering dimensions of the first bracket and the second bracket into a computer-aided design program and printing the first bracket and the second bracket with a 3D printer.

* * * * *

UNITED STATES PATENT AND TRADEMARK OFFICE
CERTIFICATE OF CORRECTION

PATENT NO. : 9,927,047 B2
APPLICATION NO. : 15/219601
DATED : March 27, 2018
INVENTOR(S) : Muniz Page 1 of 1

It is certified that error appears in the above-identified patent and that said Letters Patent is hereby corrected as shown below:

In the Specification

Column 2, Line 34, replace "side view," with --side view--

In the Claims

Claim 1, Column 5, Line 2, replace "the the" with --the--

Claim 9, Column 6, Line 22, replace "first base plate and" with --first base plate, and--

Claim 16, Column 8, Lines 16-17, replace "the second the second leg exposing" with --the second leg, the second leg exposing--

Signed and Sealed this
Ninth Day of October, 2018

Andrei Iancu
*Director of the United States Patent and Trademark Office*